United States Patent
Kim

(10) Patent No.: US 10,963,266 B2
(45) Date of Patent: Mar. 30, 2021

(54) LAUNCH DEVICE FOR ELECTRONIC APPARATUS AND METHOD THEREOF

(71) Applicant: FCI Inc., Gyeonggi-do (KR)

(72) Inventor: Hee Jun Kim, Gyeonggi-do (KR)

(73) Assignee: Dialog Semiconductor Korea Inc., Seoul (KR)

( * ) Notice: Subject to any disclaimer, the term of this patent is extended or adjusted under 35 U.S.C. 154(b) by 303 days.

(21) Appl. No.: 16/029,918

(22) Filed: Jul. 9, 2018

(65) Prior Publication Data

US 2019/0012181 A1   Jan. 10, 2019

(30) Foreign Application Priority Data

Jul. 10, 2017   (KR) .................. 10-2017-0087319

(51) Int. Cl.
  *G06F 9/4401* (2018.01)
  *G06F 1/3296* (2019.01)
  *G06F 1/3234* (2019.01)

(52) U.S. Cl.
  CPC .......... *G06F 9/4406* (2013.01); *G06F 1/3243* (2013.01); *G06F 1/3296* (2013.01)

(58) Field of Classification Search
  CPC .................................................. G06F 9/4406
  See application file for complete search history.

(56) References Cited

U.S. PATENT DOCUMENTS

| | | | |
|---|---|---|---|
| 9,894,605 B2 | 2/2018 | Ma et al. | |
| 2006/0064576 A1 | 3/2006 | Chen | |
| 2007/0260867 A1 | 11/2007 | Ethier et al. | |
| 2009/0013335 A1 | 1/2009 | Hung et al. | |
| 2009/0041438 A1* | 2/2009 | Kuno | G11B 19/02 386/235 |
| 2014/0215177 A1* | 7/2014 | Kim | G06F 12/06 711/171 |
| 2015/0346806 A1 | 12/2015 | Dalal et al. | |

(Continued)

FOREIGN PATENT DOCUMENTS

| | | |
|---|---|---|
| CN | 101160631 A | 3/2006 |
| CN | 101067790 A | 4/2007 |
| CN | 101339515 A | 5/2008 |

(Continued)

OTHER PUBLICATIONS

Taiwan Office Action, Application No. 107119049, Applicant: FCI Inc., dated Nov. 19, 2019, 6 pages, and English language translation, 4 pages.

(Continued)

*Primary Examiner* — Kim Huynh
*Assistant Examiner* — Joshua Neveln
(74) *Attorney, Agent, or Firm* — Saile Ackerman LLC; Stephen B. Ackerman

(57) ABSTRACT

A launch device for launching an electronic apparatus comprises a storage unit, a main storage and a processor. The storage unit is configured to store a mini-launch code for executing a detection of an output value of a sensor, and store system driving codes which comprises a standard launch code for launching electronic apparatus. The main storage loads the mini-launch code and the system driving codes. The processor loads and executes the mini-launch code or the standard launch code.

11 Claims, 5 Drawing Sheets

(56) References Cited

U.S. PATENT DOCUMENTS

2017/0212793 A1* 7/2017 Choi ................. G06F 9/441

FOREIGN PATENT DOCUMENTS

| CN | 15204931 A | 12/2015 |
| CN | 105843641 A | 8/2016 |
| CN | 105848270 A | 8/2016 |
| TW | I263939 | 4/1993 |
| TW | 200903248 | 4/1997 |

OTHER PUBLICATIONS

Chinese Office Action, Application No. 201810576737.6, Application: Dialog Semiconductor Korea Inc., Transmittal date: Jan. 6, 2021, 11 pages.

* cited by examiner

LAUNCH DEVICE FOR ELECTRONIC APPARATUS AND METHOD THEREOF

FIELD OF INVENTION

The present disclosure relates to a launch device and a launch method for an electronic apparatus and, in particular, to a launch device and a launch method utilizing sensors.

BACKGROUND OF INVENTION

An electronic apparatus works according to surrounding circumstances reported by internal or external sensors, or according to conditions of the apparatus itself. For example, an electronic apparatus detects movement by utilizing an internal camera to capture user gestures, or detects circumstance by utilizing an external monitor.

Power consumption remains at same level whether the electronic apparatus is running or not because operations of sensors are required. When processors are running for the operations of above-mentioned sensors, the electronic apparatus consume great power even though the electronic apparatus are in sleep mode.

Present solutions to reduce power consumptions are periodically read output values of the sensors and notify the central processing unit (CPU) of the main system when the output values of the sensors meet predetermined conditions. However, an external chip is required and communications between the external chip and the chip of the main system are required as well.

In addition, even ignoring the problems raised from the external chips, an inner processor of the electronic apparatus still have to periodically launch in order to read the output values of the sensors, and determine whether the output values of the sensors meet conditions or not. Thus, the electronic apparatus have to remain in an enable condition in order to initialize hardware or storages of the electronic apparatus. As a result, various power consumptions are required according to bits of the executing codes.

SUMMARY OF INVENTION

The object of the present disclosure is providing a launch method and a launch device for an electronic apparatus to supply only essential power for reading an output value of sensor even the power of the electronic apparatus is switched off, so that the power consumption of the electronic apparatus can be minimize.

The object of the present disclosure is providing a launch method and a launch device for an electronic apparatus where a processor is only utilized to determine whether the output values of the sensor meet predetermined conditions or not even the power of the electronic apparatus is switched off during the process of periodically reading the output value of the sensor. Therefore, only power for the processor to read the output values of the sensor is required, so that the power consumption of the electronic apparatus can be minimize.

The first embodiment of the present disclosure provides an internal launch device of an apparatus. The launch device includes a storage unit, a main storage and a processor. The storage unit is configured to store a mini-launch code for executing a detection of an output value of a sensor, and is configured to classify and store system driving codes for driving the electronic apparatus. The main storage stores the mini-launch code and the system driving codes. The processor is configured to read and transfer at least one of the mini-launch code or the system launch codes to the main storage, and is configured to execute the mini-launch code or the system launch codes.

The embodiment of the launch device further comprises at least one of the following features.

The system launch codes include an operating system image and a standard launch code for launching the electronic apparatus.

The processor executes the mini-launch code for detecting the output value of the sensor, determines whether the output value of the sensor meets a predetermined condition, and executes the standard launch code when the output value of the sensor meets the predetermined condition.

The second embodiment of the present disclosure provides a launch method of an apparatus. The launch method includes periodically receiving a wake-up signal by utilizing a processor, loading a mini-launch code for detecting an output value of a sensor into a main storage after receiving the wake-up signal, loading a standard launch code for launching the electronic apparatus and a system driving code into the main storage, and executing the mini-launch code or the standard launch code by utilizing the processor.

The present disclosure only operates a minimum number of components for detecting the output value of the sensor rather than operates the whole system of the electronic apparatus. Therefore, power is only provided to the essential components for reading an output value of sensor, so that the power consumption of the electronic apparatus can be minimized.

DETAILED DESCRIPTION OF PREFERRED EMBODIMENTS

The following context practically introduces parts of embodiments of the present disclosure accompanying with exemplifying drawings. It should be understood that the same reference numbers refer to the same components may be used in different drawings. If structures or functions of a component are well-known will not result in confusion even without any illustration, the detailed introduction will be omitted.

The terms first, second, A, B, (a), (b) are utilized to distinguish different components instead of limiting the arrangements or orders of the embodiments. When components are "comprised" or "included", it means the composition may include components which are not mentioned, that is, the composition is not exclusively composed by the mentioned components.

As used herein, the term "launch" refers to actions for waking-up an electronic apparatus (e.g., computing device)

from sleep mode or starting the electronic apparatus. A launch device of the present disclosure remains active when an electronic apparatus is in sleep mode or turned off.

Figure 1:
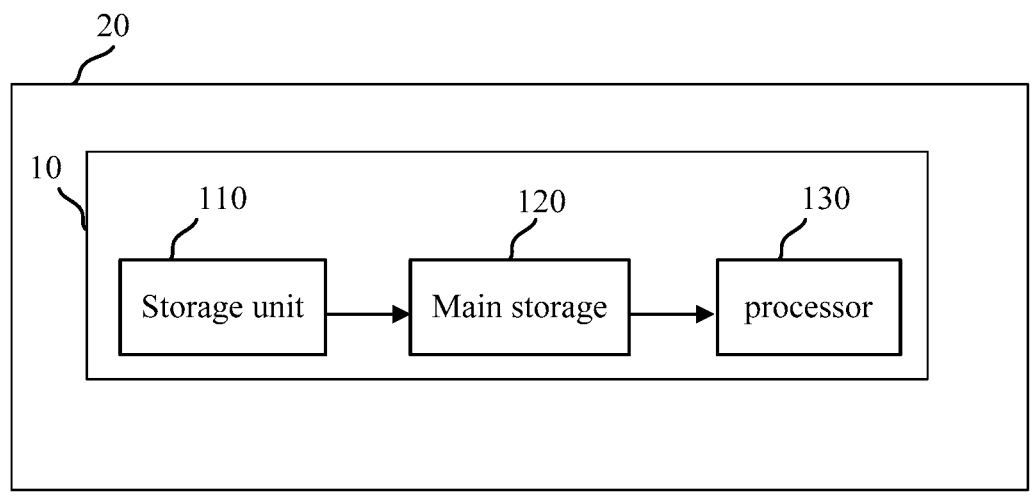
FIG. 1 is a block diagram of a launch device of the present disclosure.

FIG. 1 illustrates the block diagram of a launch device 10 of the present disclosure. The launch device 10 of the present disclosure refers to a device/component to drive an electronic apparatus 20 when output values of sensors (not shown) meet predetermined conditions. The launch device 10 of the present disclosure includes a storage unit 110, a main storage 120 and a processor 130. The launch device is coupled to sensors of the electronic apparatus or external sensors of other devices.

The storage unit 110 is configured to store large amounts of data when the main storage is unable to store. More particularly, the storage unit 110 store launch codes for driving system, images of operating system (OS), and applications data. The launch codes refer to codes (e.g., microcode) to launch the apparatus.

The launch device of the present disclosure periodically reads the output value of the sensor and launches the electronic apparatus if the output values meet the predetermined conditions. The storage unit 110 is configured to classify and storage the launch codes in order to reduce power consumption. For example, the storage classifies codes into codes for comparing the output value of the sensor with the predetermined conditions and codes for loading the OS images into the main storage 120.

The main storage 120 temporarily store intermediate data or results generated by the processor 130. The main storage 120 temporarily store data from storage unit 110 required by the processor 130. In the embodiments of the present disclosure, the main storage 120 is a static random-access memory (SRAM).

The processor 130 controls the operations of the electronic apparatus. When the system is launching after the electronic apparatus receives power, codes stored in the storage unit 110 will be loaded into the main storage 120, then the processor 130 will make the main storage 120 readable in order to execute the codes for launching the electronic apparatus.

More particularly, the processor 130 executes initialization of the electronic apparatus and drives the electronic apparatus. The processor 130 determined whether the output value of the sensor meet the predetermined conditions or not. The OS images stored in the storage unit 110 will be loaded into the main storage 120 to drive the OS, then the applications data stored in the storage unit 110 will be loaded into the main storage 120 in order to execute the particular applications on the electronic apparatus.

In the process of launching an electronic device of present technology, all of the execute codes, whether regards to detect the output values of sensors or not, and some unnecessary data will be copied into the main storage 120 when determining whether to launch the electronic apparatus according to the output value of the sensor. Therefore, longer time and larger power consumption are required because the main storage 120 has to copy a huge amount of the codes. The present disclosure does not load all of the codes, instead, the storage unit classifies the stored codes and only loads essential codes when determining whether the launch codes are met or not. Therefore, the power consumption is reduced during the process of determining whether a launching condition is met or not.

Figure 2:
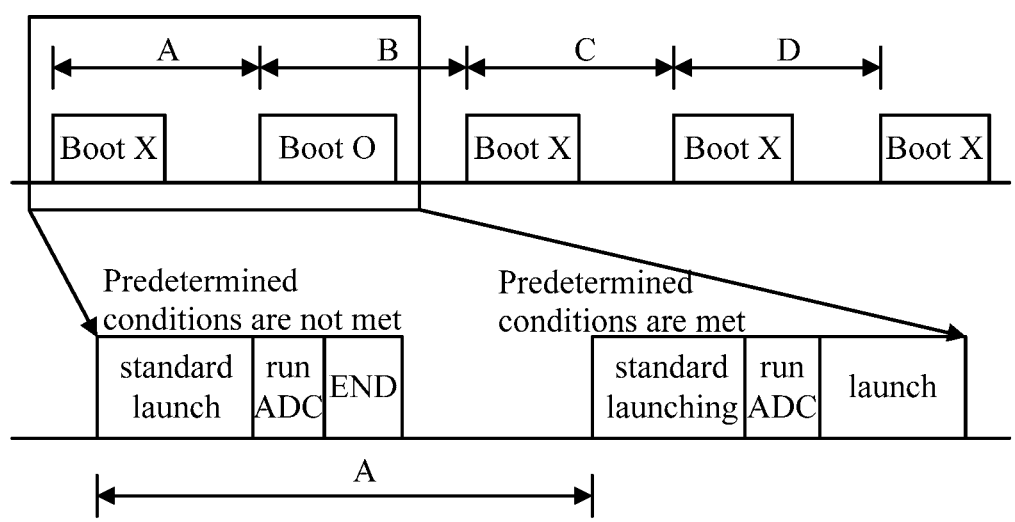
FIG. 2 is a time sequence of a standard launch mode of the present disclosure.
Figure 3:
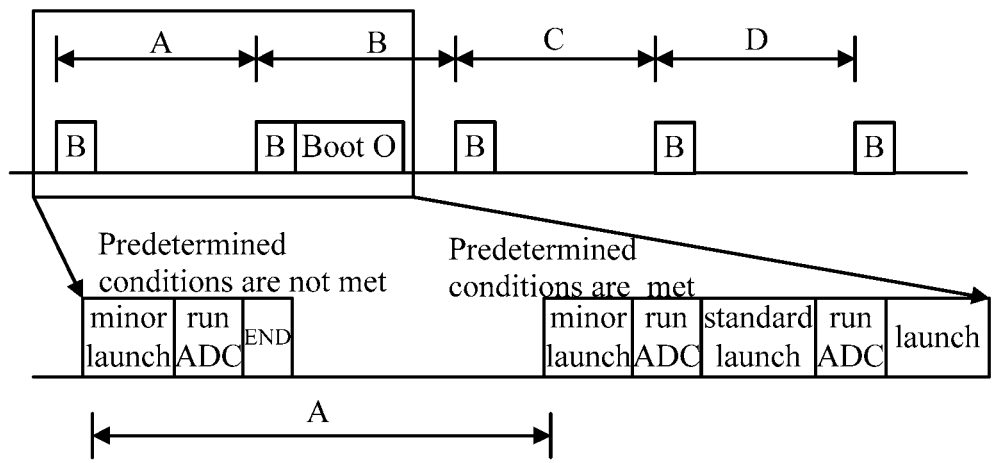
FIG. 3 is a time sequence of a mini-launch mode of the present disclosure.

FIG. 2 illustrates time sequence in a standard launch mode of the launch device of the present disclosure. FIG. 3 illustrates time sequence in a mini-launch mode of the launch device of the present disclosure.

As used herein, "standard mode" refers to a mode normally applied to electronic apparatus when determining whether the launching conditions are met or not according to output values of sensors. In the standard launch mode, all execution codes for driving the electronic apparatus (as named system driving codes hereinafter) will be loaded into the main storage 120, and then the system will be launched when the output value of the sensor meets the launching condition. The system driving codes include standard launch codes for launching the electronic apparatus, OS images, etc.

As used herein, "mini-launch mode" refers to a mode that the electronic apparatus launches a minimum number of components, for both hardware and software, and executes a minimum number of operations required for detecting the output value of the sensor as above-mentioned standard launch mode. That is, in the basis of the present technologies, the present disclosure have the same operation for launching the electronic apparatus, the difference between the present technologies and the present disclosure only exist in the execute codes for comparing the output value of the sensor with the predetermined launching condition. In other words, the difference between the present technologies and the present disclosure is the process of determining whether the output value of the sensor meets the predetermined launching condition or not. In mini-launch mode, only the essential codes for periodically read the output value of the sensor will be executed.

Please refer to FIG. 2, where the launch device periodically launches the electronic apparatus in standard launch mode. Take period A, period B, period C, and period D in FIG. 2 for example, all of the system driving codes for driving the system will be loaded into main storage 120 in standard launch mode. To make the system become drivable, the electronic will be initialized after the system driving code are loaded into the main storage 120, then an analog-digital converter (ADC) which is coupled to the sensors will be driven for detecting the output value of the sensor. The system launching process will be ended when the output value of the sensor do not meet the predetermined launching condition preset in the system (Boot X). The electronic apparatus executes preset operations when the output value of the sensor meets the predetermined launching condition preset in the system (Boot O).

More particularly, as shown in FIG. 3, the electronic apparatus only periodically executes a mini-launch code in mini-launch mode. Take period A, period B, period C, and period D in FIG. 3 for example, in mini-launch mode, only the mini-launch code will be loaded in to the main storage 120. The system driving codes are not loading into the main storage 120. Therefore, the electronic apparatus does not have to be in the condition which is able to launch the while electronic apparatus, instead, the electronic apparatus only have to be in the condition which is only able to detect the output values. As a result, only the processor which is utilized to determine whether the output value of the sensor meet the predetermined conditions or not will be operated. In comparison with the standard launch code, the occupation of the mini-launch code is extremely small so that the time spent on loading the codes into the main storage 120 will become shorter. The mini-launching process will be ended when the output value of the sensor do not meet the predetermined launching condition preset in the system. The electronic apparatus executes standard launching operations as shown in FIG. 2 when the output value of the sensor meets the predetermined launching condition preset in the system (Boot O).

Figure 4:
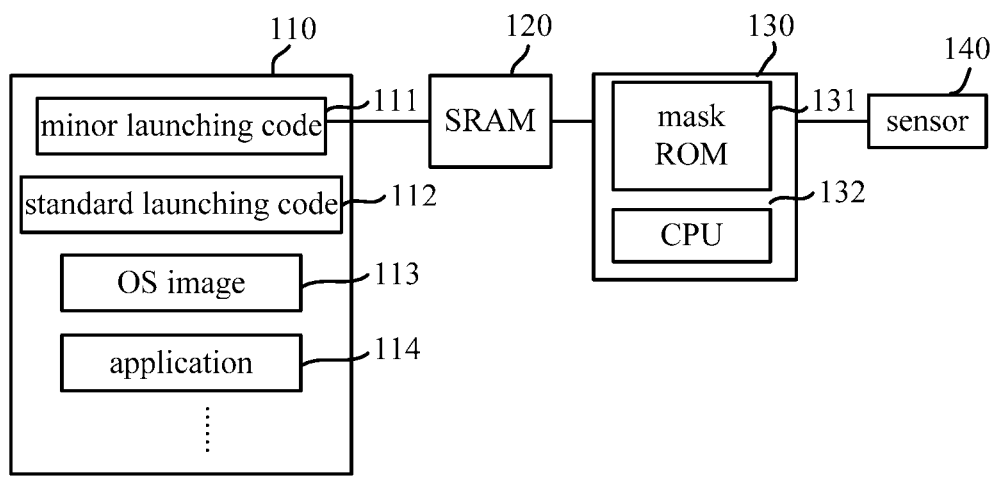
FIG. 4 is a block diagram of the mini-launch mode of the launch device of the present disclosure.
Figure 5:
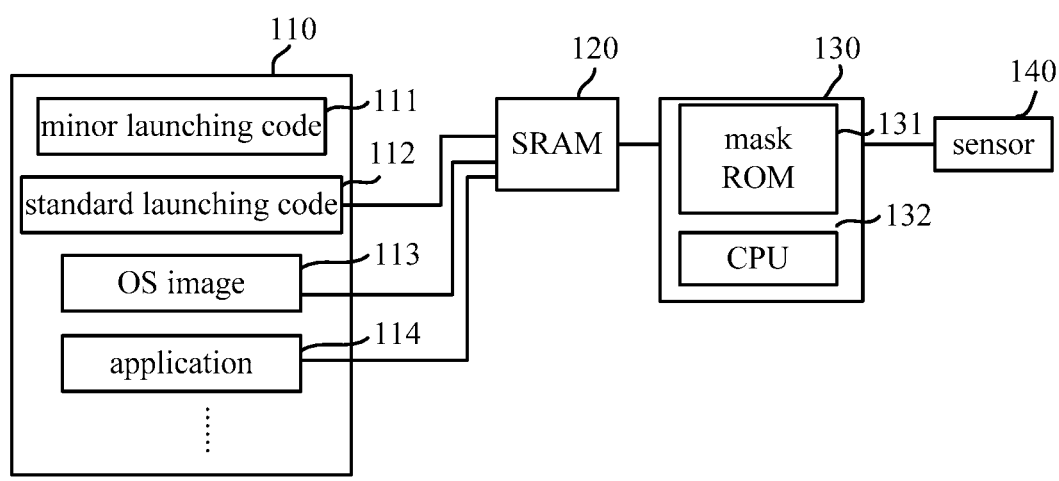
FIG. 5 is a block diagram of the standard launch mode of the launch device of the present disclosure.

FIG. 4 illustrates a block diagram of the mini-launch mode of the launch device of the present disclosure. FIG. 5 illustrates a block diagram of the standard launch mode.

Please refer to FIG. 4 and FIG. 5. The launch device includes a storage unit 110, a main storage 120 and a processor 130 which is coupled to an external sensor 140. The sensor 140 can be an internal sensor disposed in the electronic apparatus or an external sensor connected with the electronic apparatus. The embodiment of present disclosure take utilizing one sensor as an example, however, for a skilled person in the art, the sensor 140 of the present disclosure can refer to a sensing system composed by a plurality of internal or external sensors. The storage unit 1120 classifies the stored launch codes for launching the electronic apparatus into a mini-launch code 111 and standard launch codes 112.

Figure 6:
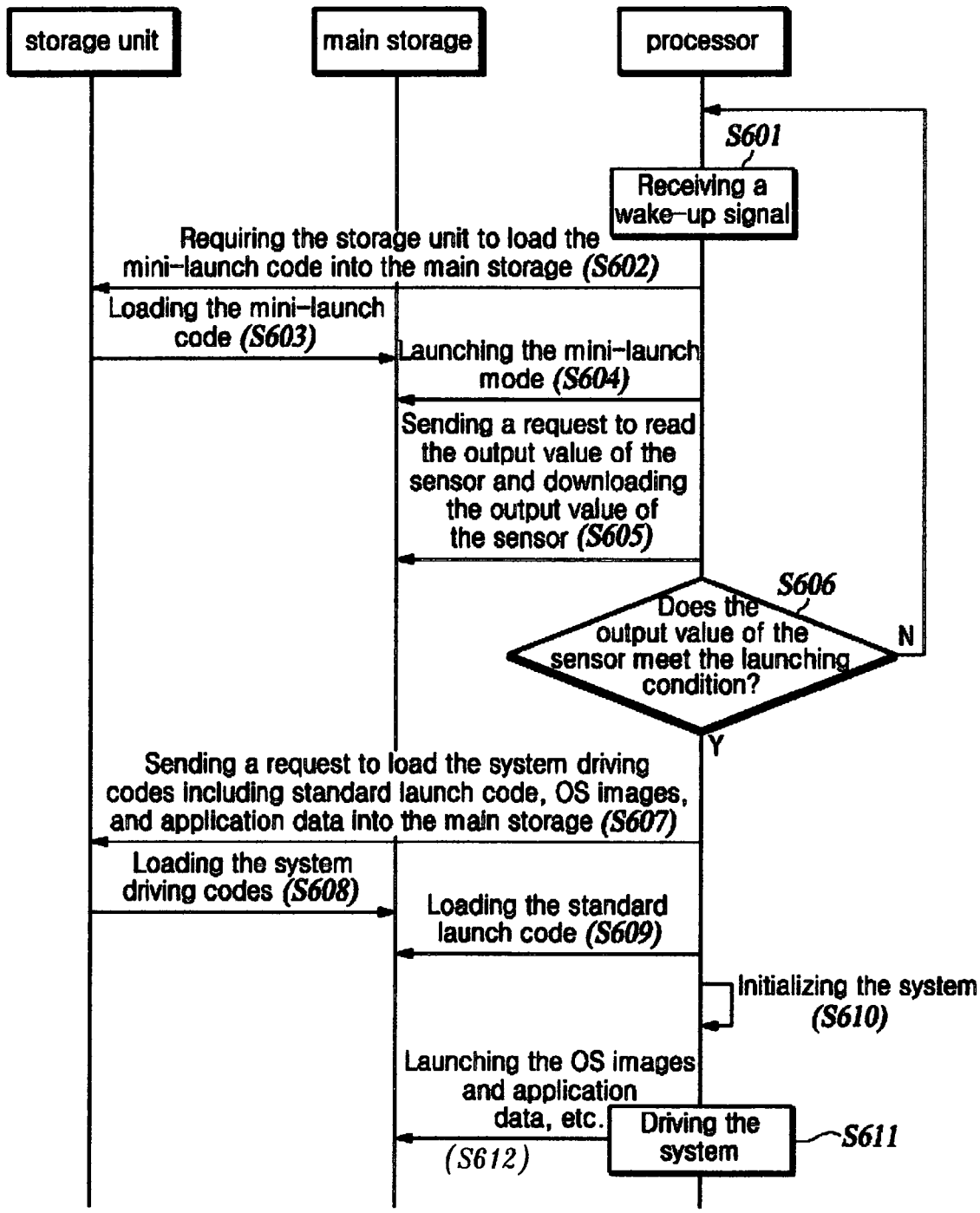
FIG. 6 is a flowchart of the launching process of the launch device of the present disclosure.

FIG. 6 illustrates the flowchart of the launching process of the electronic apparatus. The embodiment shown in FIG. 6 will take the storage unit 110 is flash memory and the main storage 120 is SRAM as an example.

In S601, the processor receives a wake-up signal. The wake-up signal is generated periodically according to the time set by the internal counter (not shown) of the launch device. The processor periodically receives the wake-up signal and executes launching modes.

In the embodiment of the present disclosure, the launching modes include the mini-launch mode and the standard launch mode. The electronic apparatus will enter the standard mode when the launching condition is met in the mini-launch mode, i.e., after S601, the electronic apparatus will execute the mini-launch mode after the processor 130 receives the wake-up signal.

After receiving the wake-up signal, the processor 130 will require the storage unit 110 to load the mini-launch code into the main storage (S602), and the mini-launch code will be loaded into the main storage 120 upon requirement (S603). Please refer to FIG. 4, in the codes stored in the storage unit 110, only the mini-launch code will be loaded into the main storage 120. The standard launch code 112, OS images 113 and application data 114, etc. will not be loaded into the main storage 120. The processor 130 executes S602 and S603 according to the boot loader stored in a Mask ROM 131 disposed in the processor 130. Before executing S602 and S603, the electronic apparatus enables to be driven due to initialization process executed by the initialization code Init stored in the Mask ROM 131 before.

The mini-launch code 111 does not include the codes for operating the OS of the electronic apparatus or the codes for executing applications. The mini-launch code 111 only refers to the codes for detecting the output value of the sensor, i.e., the mini-launch code 111 only includes the essential codes for reading the output value of the sensor.

The mini-launch mode is launched after the processor 130 executes the mini-launch code 111 (S604). In the mini-launch mode, the processor sends a request to the main storage 120 for reading and downloading the output value of the sensor (S605). In the meanwhile, the processor 130 checks the operational status of the sensor and turns on the power if the power of the sensor is switched off. After the power of the sensor is turned on, the launch devices required a stabilization period before enters in standby mode. After entering the standby mode, the launch device launches the ADC to read the output value of the sensor according to the preset intervals.

The processor 130 determines whether the output value of the sensor meets the launching condition or not (S606). If the launching condition is met, the launch device launches the standard launch mode. If the launching condition is not met, the launch device remains in standby mode until the next wake-up signal.

The processor 130 sends a request to the storage unit 110 to load the system driving codes including standard launch code 112, OP images 113, and application data 114 into the main storage if the output value of the sensor meets the launching condition (S607). The system driving codes are loaded into the main storage 120 upon the request (S607).

The standard launch code 112 includes the codes needed when launching the electronic apparatus. For example, the standard launch code 112 includes the code for initializing the entire hardware of the electronic apparatus and the code for launching OS, etc. FIG. 3 illustrates the condition that the launch device is in the standard launch mode. The standard launch code 112 is loaded into the main storage 120 and the OS images 112 and application data 114 will be downloaded according to the standard launch code 112.

The processor enters the standard launch mode after loading the standard launch code 112 from the main storage 120 (S609). The processor 130 initializes the entire hardware of the electronic apparatus in the standard launch mode (S610) and drives the system to launching the OS (S611). The electronic apparatus executes predetermined operations when the system is driven.

Figure 7:
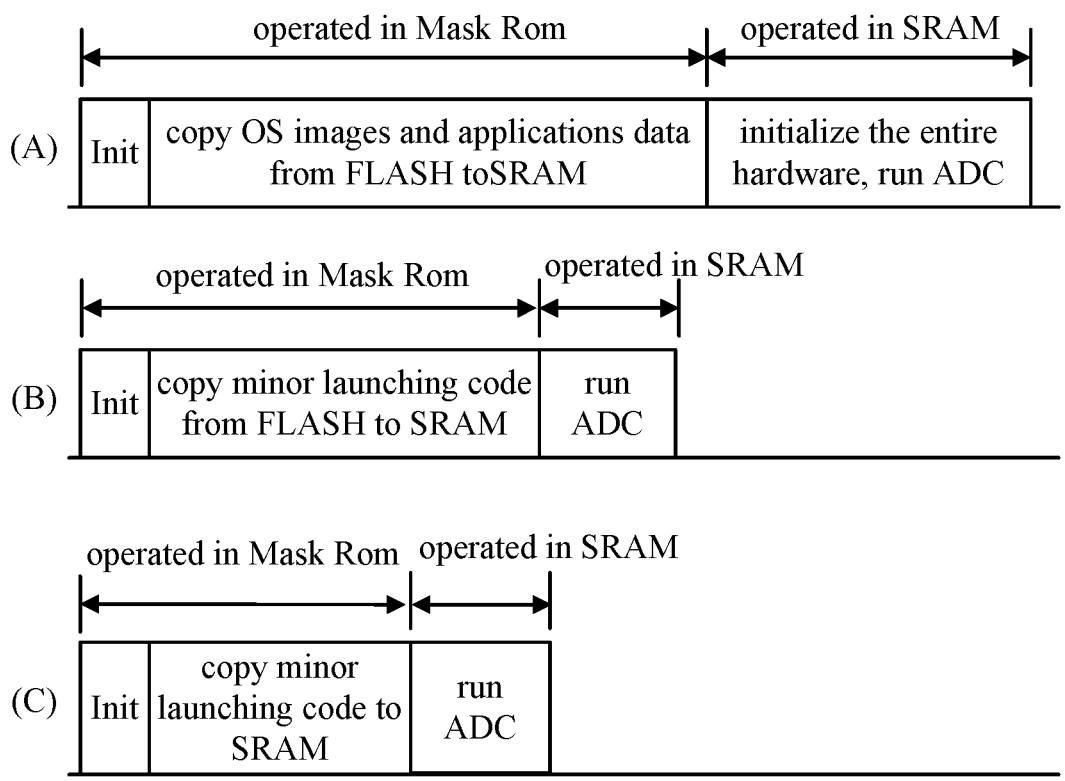
FIG. 7 is an illustration of needed time of the launching processes of the present disclosure.

FIG. 7 illustrates the needed times of different launching mode in the present disclosure. The image (A) of FIG. 7 illustrates the needed time for determined the output value of the sensor meets the launching conditions or not in standard lunching mode. The images (B) and (C) of FIG. 7 illustrate the needed time for determined the output value of the sensor meets the launching conditions or not in mini-launch mode.

Please refer to FIG. 7. In the standard launch mode and the mini-launch mode, the mask ROM will be initialized at first. The initialization codes of the standard launch mode and the mini-launch mode for driving the chip are the same.

Please refer to the image (A) of FIG. 7 which illustrates the situation that the electronic apparatus periodically launching the standard launch mode where the system driving codes are loaded from storage unit into the main storage. To load the whole system driving code, the clock signals have to be more than 10 MHz and communication between chip and external storage is required. Thus, launching time is longer and the power consumption is higher. In addition, the initialization for the entire hardware of the electronic apparatus is required before reading the output value of the sensor. Therefore, extra time is required before driving the ADC to read the output value of the sensor.

Please refer to image (B) of FIG. 7 which illustrates the mini-launch mode where only the essential execute codes, the mini-launch code, is loaded into the main storage. The less execute codes, in comparison with system driving code, are loaded therefore the loading time is shorter. In addition, it is no longer essential to initialize the entire whole hardware when driving the sensor. Only the initialization of the sensor is required. Thus the time for reading the output value of the sensor becomes shorter.

Please refer to image (C) of FIG. 7 which illustrates the situation that the mini-launch code is stored in the retention memory instead of FLASH. The retention memory required extremely low power consumption for keeping awake. The capacity of the retention memory is smaller than FLASH but its transmitting bandwidth is wider than FLASH. The mini-launch code can be stored in the retention memory because its bits are small. In another embodiment of the present disclosure, the mini-launch code can be stored in external retention storage. The time for loading the mini-launch code from retention storage is shorter than the time for loading the mini-launch code rom FLASH, and the power consumption of the retention is lower than FLASH.

In another embodiment of the present disclosure, the electronic apparatus is launched when the output value of the sensor, which read by the launch device, meet the predetermined condition. For example, the electronic apparatus only launches when a video recorder, such as a block box recorder or a closed-circuit television (CCTV), identifies an individual.

To conclude, the above-mentioned embodiments are utilized to exemplify rather than limit the technology concept of the present disclosure. Any modification and variation which can be completed by a skilled person in the art on the basis of the specification should fall into the scope of the claims protected by the present disclosure.

The invention claimed is:

1. A launch device for launching an electronic apparatus, comprising:
a storage unit configured to separately store a mini-launch code and system driving codes for driving the electronic apparatus, the mini-launch code for detecting an output value of a sensor that is internal or external to the electronic apparatus;
a main storage configured to load the mini-launch code and the system driving codes; and
a processor configured to read and transfer at least one of the mini-launch code or the system launch codes to the main storage, and configured to execute the mini-launch code or the system launch codes,
wherein the storage unit comprises a first storage for storing the mini-launch code and a second storage for storing the system launch codes, and
wherein bandwidth of the first storage is wider than bandwidth of the second storage.

2. The launch device for launching the electronic apparatus according to claim 1, wherein the system launch codes include a standard launch code for launching the electronic apparatus and an operating system image.

3. The launch device for launching the electronic apparatus according to claim 2, wherein the standard launch code includes an initialization code for initializing hardware of the electronic apparatus and a loading code for loading the operating system image.

4. The launch device for launching the electronic apparatus according to claim 1, wherein the processor executes the mini-launch code for detecting the output value of the sensor, determines whether the output value of the sensor meets a predetermined condition, and executes the standard launch code when the output value of the sensor meets the predetermined condition.

5. The launch device for launching the electronic apparatus according to claim 1, wherein the processor executes the mini-launch code periodically according to a predetermined period set by an internal counter disposed in the electronic apparatus.

6. The launch device for launching the electronic apparatus according to claim 1, wherein the processor detects an operational status of the sensor, turns on the sensor when the power of the sensor is switched off, and detects the output value of the sensor.

7. A launch method for launching an electronic apparatus, comprising:
periodically receiving a wake-up signal by utilizing a processor;
loading a mini-launch code for detecting an output value of a sensor into a main storage after receiving the wake-up signal, wherein the sensor is internal or external to the electronic apparatus;
loading a standard launch code for launching the electronic apparatus and a system driving code into the main storage, wherein the system driving code comprises an operating system image; and
executing the mini-launch code or the standard launch code by utilizing the processor,
wherein the mini-launch code is stored in a first storage and the system driving code is stored in a second storage, and
wherein bandwidth of the first storage is wider than bandwidth of the second storage.

8. The launch method for launching the electronic apparatus according to claim 7, further comprising: detecting the output value of the sensor by utilizing the processor to execute the mini-launch code, and determining whether the output value of the sensor meets a predetermined condition; and
executing the standard launch code when the output value meets the predetermined condition.

9. The launch method for launching the electronic apparatus according to claim 8, further comprising:
periodically transmitting the mini-launch code to the processor according to a predetermined period set by an internal counter of the electronic apparatus.

10. The launch method for launching the electronic apparatus according to claim 8, further comprising:
detecting an operational status of the sensor, and turning on the power of the sensor when the power of the sensor is switched off.

11. The launch method for launching the electronic apparatus according to claim 7, wherein the standard launch code includes an initialization code for initializing hardware of the electronic apparatus and a loading code for loading the operating system image.

* * * * *